J. THISSEN.
CUSHION WHEEL.
APPLICATION FILED MAY 15, 1913.
1,124,675.
Patented Jan. 12, 1915.
2 SHEETS—SHEET 1.
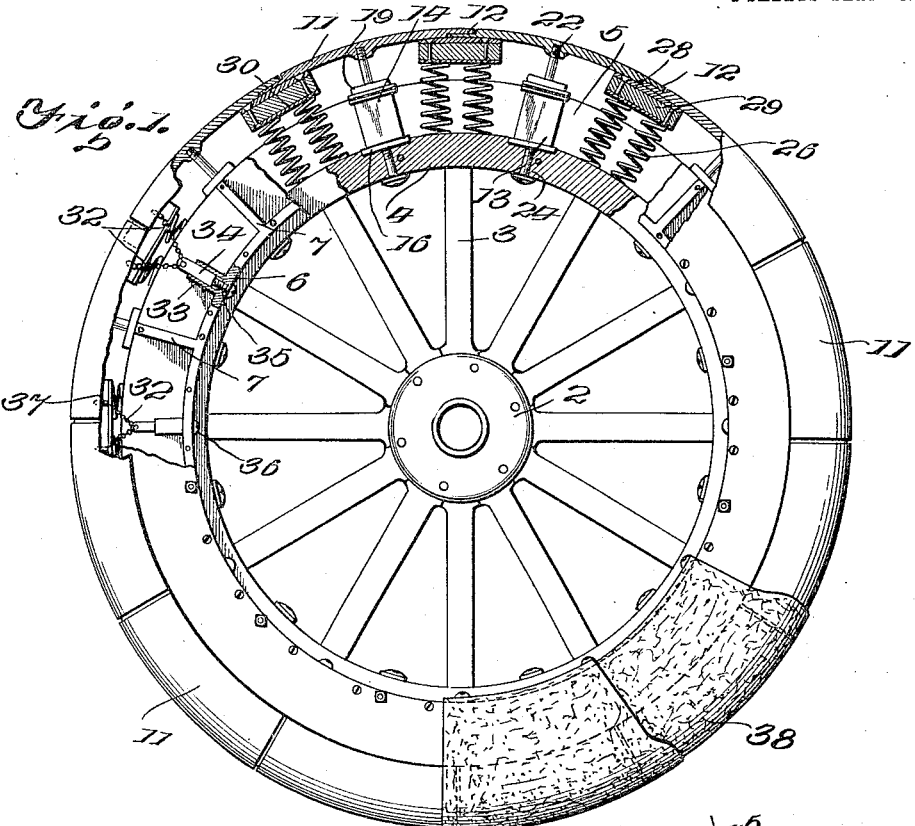
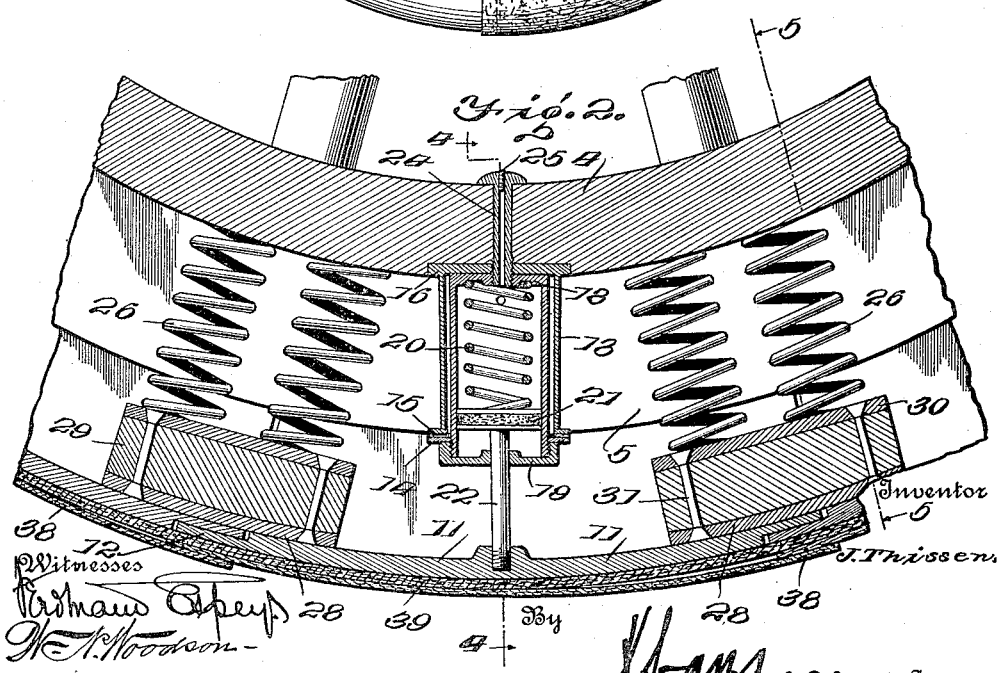

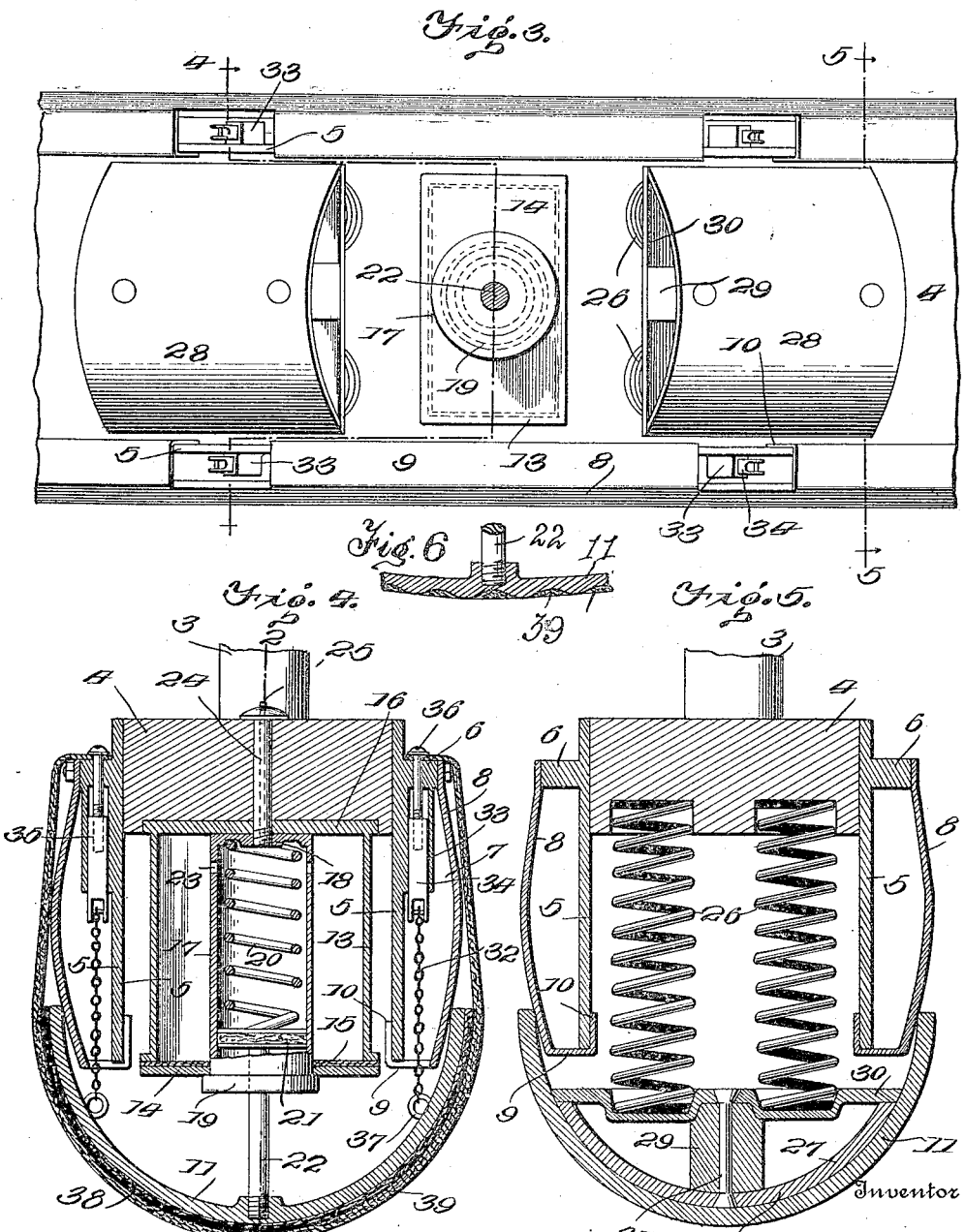

UNITED STATES PATENT OFFICE.

JACOB THISSEN, OF KANE, PENNSYLVANIA.

CUSHION-WHEEL.

1,124,675.  Specification of Letters Patent.  Patented Jan. 12, 1915.

Application filed May 15, 1913. Serial No. 767,843.

*To all whom it may concern:*

Be it known that I, JACOB THISSEN, citizen of the United States, residing at Kane, in the county of McKean and State of Pennsylvania, have invented certain new and useful Improvements in Cushion-Wheels, of which the following is a specification.

My invention relates to means for cushioning vehicle wheels and particularly to resilient or cushion tires for vehicles.

The primary object of my invention is the provision of a very simple and effective resilient tire wherein the tire proper is formed of independently yieldable sections each section being supported by its own cushioning means and so constructed that each section may be removed for replacement or repair without the necessity of removing or disturbing the other sections.

A further object is the provision of fluid cushioning means disposed between the tire proper and the felly, there being one of these cushioning means for each of the sections.

Still a further object is the provision in connection with the fluid cushioning means disposed one for each section, of spring cushioning means disposed at the overlapping ends of the sections.

A further object is to so construct the tire that provision is made for a dust-proof joint between the plates forming the tire sections and the side plates attached to the felly, and so construct these coacting plates that the plates forming the sides of the felly will constantly bear against the plates forming the sections of the tire without, however, impeding the free movement of these tire sections.

A further object is the provision in a tire of a plurality of tire sections outwardly urged by yieldable means and provision in connection therewith of means for limiting the outward movement of the tire sections under the impulse of the cushioning means, said limiting means being adjustable.

Other objects will appear in the course of the following description.

My invention is illustrated in the accompanying drawings, wherein:

Figure 1 is a side elevation partly in section of a wheel constructed in accordance with my invention; Fig. 2 is an enlarged sectional view on the line 2—2 of Fig. 4; Fig. 3 is a plan view of a portion of the wheel felly and the cushioning devices therein, the section of the tire or rim being removed; Fig. 4 is a transverse section on the line 4—4 of Fig. 3; Fig. 5 is a transverse section on the line 5—5 of Fig. 3. Fig. 6 is a sectional detail illustrating a modification in the construction.

Referring to Fig. 1, it will be seen that my improved wheel comprises a hub portion 2 of any suitable description having the radially extending spokes 3 and a felly or rim 4. All these parts may be formed of any desired material and of any suitable form.

Referring to Figs. 3, 4 and 5, it will be seen that attached to the rim or felly 4 are the side plates 5 which extend outward from the rim and parallel to each other and may be attached to the rim by means of bolts or in any suitable manner. The side plates 5, it will be seen, form part of the rim and form a housing for the cushioning devices hereafter described. The inner margin of each of the side plates 5 is formed with the outwardly projecting flange 6. Formed with or attached to the side plates 5 at spaced intervals are the laterally projecting ribs 7 the outer faces of which are curved, these ribs having the same length as the depth of the side plates 5 and forming reinforcing ribs. Attached to the ribs are counter-sunk bolts or screws and also attached to the outer edges of the flanges 6 are the curved plates 8. These plates are outwardly bowed, as shown clearly in Figs. 4 and 5, and are preferably made of steel. The outer edges of the plate are inwardly bent as at 9, and then returned over the inner faces of the plates 5 as at 10.

The tire proper is formed of a series of U-shaped sections designated 11. These sections are curved length-wise to conform to the curvature of the circumference of the wheel and are U-shaped in cross-section as illustrated in Fig. 4. As shown in Fig. 2, each section overlaps at one end as at 12 the adjacent end of the next adjacent section. It is to be understood, however, that these sections 11 have a sliding movement relative to each other and are to this extent independent of each other. The margins of these sections 11 as illustrated in Fig. 4 bear against the inwardly curved margins of the plates 8 and have sliding engagement with these plates. These plates 11 are slightly resilient so that as they are forced inward they will have a wedging engagement with the bowed plates 8 and when the pressure which forces them inward is relieved they will tend to spring out to their normal position.

Disposed at spaced intervals within the tire are a plurality of casings 13. These casings, as illustrated in Fig. 3, are rectangular in form and extend transversely to the felly and are set into sockets formed in the face of the felly. Each of these casings 13 is closed at its outer end by means of a plate 14 with packing 15 interposed between the plate and the adjacent end of the casing. This plate 14 is removable and is attached to the end of the casing 13 in any suitable manner. The inner end of the casing 13 is closed by an integral plate 16. Each casing forms a reservoir for oil or other fluid. Disposed within each casing is a cylinder 17. This cylinder is closed at its inner end by means of the wall 18 and at its outer end by means of a cap 19. Each cylinder projects through the plate 14 and is screw threaded at its end for the engagement of the cap 19 which is therefore removable. It will be seen that the cap 19 holds the cover 18 in close contact with the casing 13. Disposed within each of the cylinders 17 is a coil spring 20 and resting upon the outer end of this spring is a piston 21 having a piston rod or plunger 22 which extends out through the cap 19 and at its outer end has screw-threaded engagement with the boss upon the plate 11 forming one of the tire sections. It will be noted that this boss is located at the middle of the plate. The interior of the cylinder 17 is intended to be filled with oil or other fluid, as is the interior of the casing 13. The inner end of each cylinder is formed with one or more perforations 23 whereby fluid may pass from the interior of the cylinder 17 into the casing 23 or back again. Each cylinder and casing is held in place by means of a bolt 24 which passes through the felly or rim 4, this bolt being tubular as illustrated in Fig. 4 and being closed by means of a plug 25.

It will be seen that the springs 20 will act to urge the plunger 22 outward and thus urge the tire sections outward. These sections are additionally urged outward by means of a plurality of pairs of springs 26, see Figs. 1 and 5, these springs being coil springs resting in sockets formed upon the face of the felly 4 and at their outer ends bearing in sockets formed in a head 27. There are as many heads 27 as there are pairs of coil springs 26 and each head comprises a laterally and longitudinally curved plate 28, a filling piece 29 and a transverse plate 30. The plate 30, the filling piece 29 and the plate 28 are connected to each other by radially disposed bolts or rivets 31. It will be seen by Fig. 2 that these heads 27 are of sufficient length and are so disposed as to bear against the under face of the joint formed between the overlapping margins of the adjacent section plates 11. There is a pair of springs 26 to each of these members 27, as shown in Figs. 2 and 5. The heads 27 are not attached to the section plates 11 but merely bear against the inner faces of the section plates. If there was no resistance offered to the expansion of these springs, they would merely act to force the section plates 11 outward so that the tire would be expanded to such an extent that the margins of the section plates would not engage with the plates 8. In order to prevent this and to hold the section plates in proper normal relation to the felly 4, I provide chains 32 which, as illustrated, extend radially and which limit the outward movement of the plates 11 under the action of the springs 20 and 26. Preferably, the limiting action of these chains is adjustable so that the tire sections may be adjusted relative to the tension of the springs 20 and 26. For this purpose I form within the space between the plates 5 and the plates 8 a plurality of oppositely disposed sockets 33. These sockets are rectangular in cross section as illustrated in Fig. 3 and disposed in each socket is a slide 34, this slide having a screw-threaded aperture 35 at one end. Passing through the flanges 6 are adjusting bolts 36 having screw-threaded engagement with the slides. By turning these bolts 36 in one direction or the other, the slides will be either drawn inward or forced outward. When drawn in they will draw on the chains 27, thus drawing the tire 11 inward and compressing the springs 20 and 26. When the screws are turned in the opposite direction, however, they permit the springs 20 and 26 to urge the tire sections further outward. In order to permit the passage of the chains 32, the overturned portions 9 of the plates 8 are cutaway at intervals. Inasmuch as the tire sections are not connected to each other, these chains 32 perform a very vital function when limiting the expansion of the springs 20 and 26 and yet leaving the tire sections freely movable independently of each other. As shown in Fig. 1, there are two chains 32 extending from each of the slides 34. This pair of chains is divergently related and one chain extends to the adjacent end of one of the tire sections while the other chain extends to the adjacent end of the other tire section. The chains are attached to these tire sections by means of eyes 37. The sockets 33 are rectangular in form so as to prevent any rotation of the slides 34.

Preferably the tire sections are covered by means of sectional casings, each section being designated 38. As illustrated in Fig. 1, these sections of the casing overlap each other in the manner of scales. These sections may be made of leather or other suitable material and the inner ends of the sections are attached to the flanges 6 of the felly by means of the bolts 36 before referred to. Inasmuch as these casing sections 38 are flexible, they do not in any way impede the free movement of the tire sections 11. It will be obvious that no strain comes upon these casing sections 38 for the reason that the strain of the springs 20 and 26 is supported by means of the chains 32. Preferably a lining or padding 39 of felt or other suitable material is disposed between the tire sections 11 and the leather covering sections 38 so as to prevent the cutting of these leather covering sections.

The operation of my invention will be obvious from what has gone before. The springs 20 will constantly urge the plunger 22 outward, and these springs 20 with the springs 26 will urge the tire plate sections outward, resiliently resisting any tendency of the tire section to be forced inward. When in use, however, as each section strikes the ground and the weight of the load comes upon the section the tire section will be forced inward against the force of the spring 20 and the springs 26. The fluid contained in the cylinder 17 will cushion the inward movement of the piston 21, but as the pressure increases the fluid contained within the cylinder 17 will be forced out through the apertures 23 into the casing 13. This permits relatively light springs 20 and 26 to be used and yet prevents too great compression under load. When pressure upon a tire section has been relieved, the springs 20 will cause the outward movement of the piston 21 and the fluid contained within the casing 13 will be sucked back into the cylinder 17. Upon an inward movement of the tire sections the chains 32 will of course give, as will the outer covering sections 38. Upon the relief of pressure the tire sections will move out to the full limit of the chains 32 so as to occupy their normal position.

The margin of each tire section 11 will always have close contact with the corresponding plates 8 by reason of the bulge in said plates which will act to expand the margin of the tire section slightly so that the margin of the tire section will follow the curvature of the plates 8. As a matter of fact, there will be a wedging action between the margins of the sections 11 and the plates 8 which will tend to urge these sections outward.

It will be seen that each one of the covering sections is independently removable and that each one of the tire sections is independently removable. Thus the tire sections may be repaired and replaced and the springs repaired and replaced without difficulty. Furthermore, it will be seen that the loosening of two pairs of screws 36 will loosen one of the plates or sections 11 entirely and will partially release the two adjacent sections so as to permit the withdrawal and replacement of any one of the section plates 11.

Each section plate, it will be seen, is supported at its middle mostly by the spring 20 and the piston 21, but at its opposite ends each section plate is supported by means of the heads 28 and is forced outward by means of springs 26. This provides for an ample support for each of the section plates of the tire and at the same time permits of independent yielding movement of either the entire plate or the ends of the plate. Inasmuch as the casings 16 are seated in relatively deep sockets and held in place by the bolts 24, and inasmuch as the plunger rods 22 pass out through the caps 19 and are attached to the tire plates, creeping of the tire will be prevented relative to the wheel structure.

Each section plate is preferably transversely ribbed, the ribs being designated 39. Rubber or any other material of like nature may be laid between these ribs so as to deaden the noise of the plates contacting with the ground, and in this case it would not be necessary to provide the exterior covering sections 38.

Having described my invention, what I claim is:

1. A cushion wheel including a felly, a plurality of tire sections, outwardly extending guiding members carried by said felly on each side thereof, yielding means for exerting a constant outward pressure on the tire sections, slidable blocks disposed within said guiding members, flexible connections connecting each of said blocks to the adjacent portion of the corresponding tire section, and adjusting screws passing through portions of said felly and having screw threaded engagement with said sliding members.

2. A cushion wheel including a felly having laterally projecting flanges, tire sections arranged concentrically to the felly, springs disposed between the felly and the tire sections and urging them outward, radially disposed sockets formed on said flanges, slides mounted at the end of said sockets, flexible connections between said slides and the tire sections, and adjusting screws passing radially through the flanges of the felly and having screw-threaded engagement with said slides whereby the outward movement of the tire sections may be adjustably limited.

3. In a cushion wheel, a felly, a tire, a plurality of reservoir casings mounted on the felly in spaced relation, a plurality of cylinders one disposed in each casing and having an opening at its inner end leading into said casing, and pistons disposed in each cylinder having piston rods engaging the tire.

4. In a cushion wheel, a felly, a tire composed of sections concentric to the felly, a plurality of reservoir casings disposed at intervals upon the felly, a plurality of cylinders one for each casing and having each an opening at its inner end communicating with the interior of the casing, pistons disposed in each cylinder having piston rods each connected to the middle of one of said sections, and springs disposed within the cylinder and resisting the inward movement of the pistons.

5. A cushion wheel of the character described including a felly having flat, parallel, outwardly projecting side walls, radially arranged reinforcing ribs on the side walls having convexly curved side edges, laterally bowed side plates mounted on and supported by said ribs, a tire composed of a plurality of independent sections, each section consisting of a U-shaped plate, the sides being resilient and having telescopic and wedging engagement over the outwardly bowed side plates of the felly, means disposed between the side walls of the felly for yieldably urging the tire sections outwardly, and flexible connections disposed between the side walls and the side plates of the felly and at their outer ends engaging with said tire sections and limiting the outward movement of the tire sections under the action of said means.

In testimony whereof I affix my signature in presence of two witnesses.

JACOB THISSEN. [L. S.]

Witnesses:
  R. R. RHINES,
  EARL PARKER.

Copies of this patent may be obtained for five cents each, by addressing the "Commissioner of Patents, Washington, D. C."